United States Patent
Wu et al.

(10) Patent No.: US 10,595,007 B2
(45) Date of Patent: Mar. 17, 2020

(54) STRUCTURED-LIGHT METHOD AND SYSTEM OF DYNAMICALLY GENERATING A DEPTH MAP

(71) Applicants: Himax Imaging Limited, Tainan (TW); Himax Technologies Limited, Tainan (TW)

(72) Inventors: Biing-Seng Wu, Tainan (TW); Yu-Yu Sung, Tainan (TW); Huan-Pin Tseng, Tainan (TW)

(73) Assignees: Himax Imaging Limited, Tainan (TW); Himax Technologies Limited, Tainan (TW)

(*) Notice: Subject to any disclaimer, the term of this patent is extended or adjusted under 35 U.S.C. 154(b) by 160 days.

(21) Appl. No.: 15/927,474

(22) Filed: Mar. 21, 2018

(65) Prior Publication Data

US 2019/0297315 A1    Sep. 26, 2019

(51) Int. Cl.
*H04N 13/271* (2018.01)
*H04N 13/204* (2018.01)

(52) U.S. Cl.
CPC ......... *H04N 13/271* (2018.05); *H04N 13/204* (2018.05)

(58) Field of Classification Search
CPC ........................ H04N 13/204; H04N 13/271
See application file for complete search history.

(56) References Cited

U.S. PATENT DOCUMENTS

| | | | | |
|---|---|---|---|---|
| 10,212,408 | B1* | 2/2019 | Pappas-Katsiafas | ..... G06T 5/50 |
| 2012/0281132 | A1* | 11/2012 | Ogura | ................ H04N 5/23212 |
| | | | | 348/348 |
| 2015/0104074 | A1* | 4/2015 | Vondran, Jr. | ......... H04N 13/133 |
| | | | | 382/106 |
| 2016/0239974 | A1* | 8/2016 | Wang | ........................ G01C 3/32 |
| 2016/0330433 | A1* | 11/2016 | Shen | ........................ G01S 17/46 |
| 2018/0176542 | A1* | 6/2018 | Atanassov | .............. G06T 7/521 |

\* cited by examiner

*Primary Examiner* — Farzana Hossain
(74) *Attorney, Agent, or Firm* — Donald E. Stout; Stout, Uxa & Buyan, LLP

(57) ABSTRACT

A structured-light (SL) method of dynamically generating a depth map includes moving a lens of an image capture device to a first position associated with first depth of field (DOF); capturing first reflected structured light with the first DOF, thereby resulting in a first image; processing the first image to generate a first depth map; moving the lens to a second position associated with second DOF, the second DOF being nearer the image capture device than the first DOF; capturing second reflected structured light with the second DOF, thereby resulting in a second image; processing the second image to generate a second depth map; and combining the first depth map and the second depth map to result in a combined depth map.

4 Claims, 5 Drawing Sheets

STRUCTURED-LIGHT METHOD AND SYSTEM OF DYNAMICALLY GENERATING A DEPTH MAP

BACKGROUND OF THE INVENTION

1. Field of the Invention

The present invention generally relates to structured light (SL), and more particularly to structured-light method and system of dynamically generating a depth map.

2. Description of Related Art

Depth map is an image that contains information relevant to distance of an object (or target) from a view point (e.g., a camera). The depth map may be utilized to make rendering of three-dimensional (3D) scenes, which may be adaptable, for example, to virtual reality (VR) applications.

Structured light is a technique of projecting a known patterned light on to objects in a scene. According to reflected patterned light, surface information such as depth may then be calculated. A structured-light 3D scanner is composed of a scanner and a camera for measuring the three-dimensional shape of an object using projected light patterns. Invisible (e.g., infrared) structured light may be used to prevent interfering with other computer vision tasks (or human vision look and feel).

Performance of obtaining depth map by using structured-light technique, however, is disadvantageously affected while objects in a scene are positioned diversely such that they are respectively disposed in different focus ranges. The resultant depth map may, for example, suffer decode problem.

For the reason that conventional structured-light systems could not effectively generate a depth map, a need has arisen to propose a novel scheme for generating an optimal depth map by using structured-light technique.

SUMMARY OF THE INVENTION

In view of the foregoing, it is an object of the embodiment of the present invention to provide a structured-light system and method of dynamically generating a depth map suitable for objects disposed diversely in a scene.

According to one embodiment, a structured-light (SL) method of dynamically generating a depth map includes the following steps. A lens of an image capture device is moved to a first position associated with first depth of field (DOF). First reflected structured light is captured with the first DOF, thereby resulting in a first image, which is processed to generate a first depth map. The lens is moved to a second position associated with second DOF, the second DOF being nearer the image capture device than the first DOF. Second reflected structured light is captured with the second DOF, thereby resulting in a second image, which is processed to generate a second depth map. The first depth map and the second depth map are combined to result in a combined depth map.

DETAILED DESCRIPTION OF THE INVENTION

Figure 1:
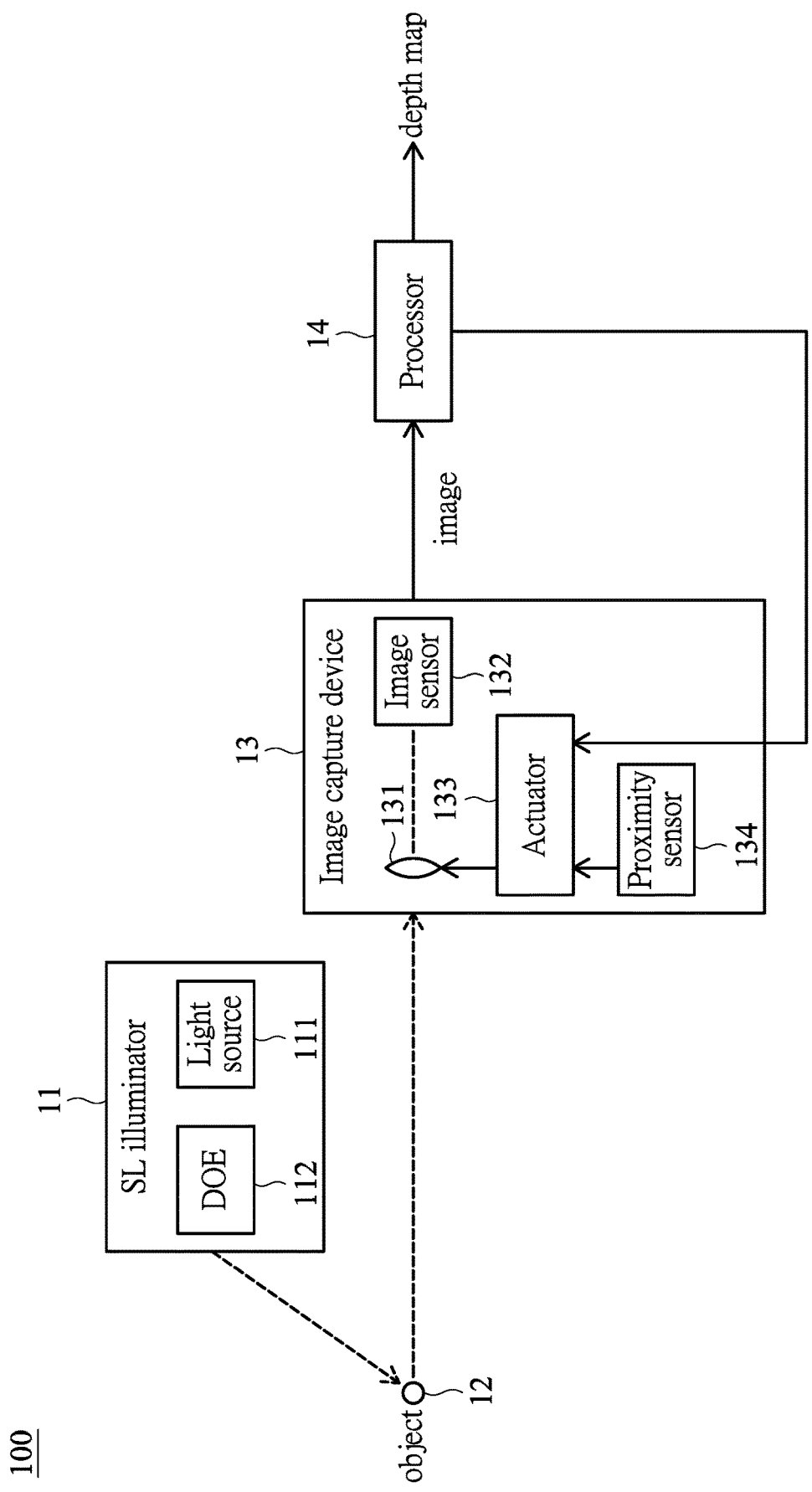
FIG. 1 shows a block diagram illustrating a structured-light (SL) system of dynamically generating a depth map according to one embodiment of the present invention.

FIG. 1 shows a block diagram illustrating a structured-light (SL) system 100 of dynamically generating a depth map (or depth image) according to one embodiment of the present invention. In the embodiment, the structured-light system 100 may include a structured-light illuminator 11 that emits predefined structured light to an object (or target) 12. The structured-light illuminator of the embodiment may include a light source 111 (e.g., infrared light-emitting device) configured to emit light, and a diffractive optical element (DOE) 112 configured to receive the emitted light (from the light source 111) and accordingly generate the structured light. The structured-light system 100 may include an image capture device (e.g., camera) 13 configured to receive reflected structured light from the object 12 and accordingly capture an image, which may be visible image or invisible image (e.g., infrared image).

Specifically, the image capture device 13 may include at least one lens 131, through which the reflected structured light is received by an image sensor 132, thus resulting in a captured image. The image capture device 13 may include an actuator 133 (e.g., a voice coil motor or VCM) configured to move the lens 131 to a position for focusing on the object 12. In autofocus (AF) mode, a proximity sensor 134 is used to detect distance of the object 12, according to which the actuator 133 moves the lens 131 to a proper position.

Figure 2:
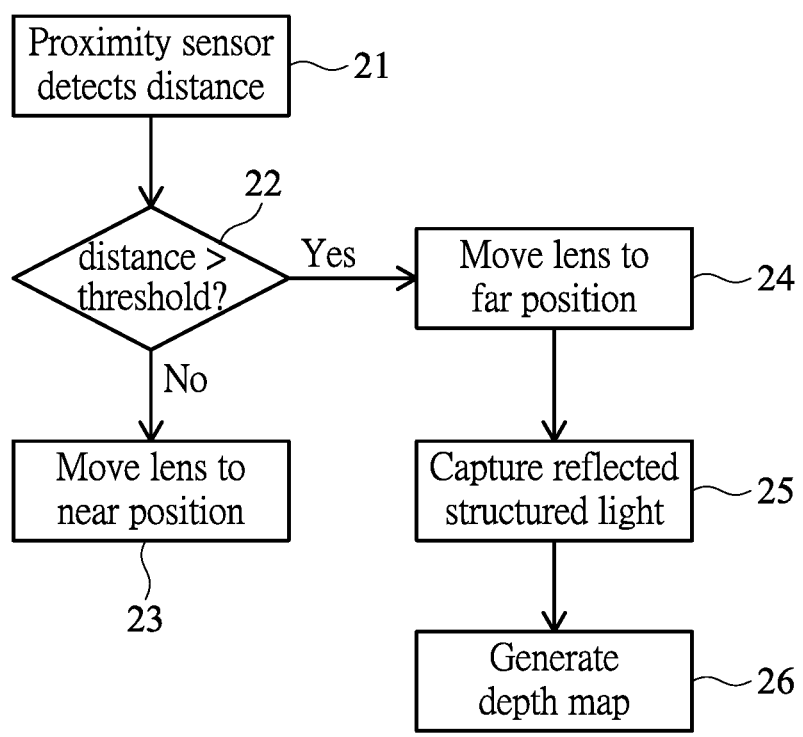
FIG. 2 shows a flow diagram illustrating a structured-light (SL) method of dynamically generating a depth map according to one embodiment of the present invention.

FIG. 2 shows a flow diagram illustrating a structured-light (SL) method 200 of dynamically generating a depth map according to one embodiment of the present invention. Specifically, in step 21, the proximity sensor 134 detects distance of the object 12. In step 22, if the detected distance is not greater than a predetermined threshold (indicating that the object 12 is near the image capture device 13), the actuator 133 then moves the lens 131 to first position (also called near position) such that associated first depth of field (DOF) substantially covers a range in which the object 12 is located, for properly focusing on the object 12 (step 23). In the specification, depth of field (DOF), also called focus range or effective range, is distance within which an acceptably sharp image may be captured.

On the contrary, if the detected distance is greater than a predetermined threshold (indicating that the object 12 is far from the image capture device 13), the actuator 133 then moves the lens 131 to second position (also called far position) such that associated second depth of field (DOF) substantially covers a range in which the object 12 is located, for properly focusing on the object 12 (step 24). Next, in step 25, the image sensor 132 captures the reflected structured light, thus resulting in a captured image containing the reflected structured light. The captured image is then processed, in step 26, to generate a depth map (or depth image).

Referring back to FIG. 1, the structured-light system 100 of the embodiment may include a processor 14 (e.g., a digital image processor) configured to receive and process the captured image (from the image capture device 13) to generate a depth map that is an image containing information relating to the distance of the object 12 from a viewpoint (i.e., the image capture device 13). According to one aspect of the embodiment, the processor 14 may control the actuator 133 to move the lens 131 to different positions for generating respective depth maps.

Figure 3:
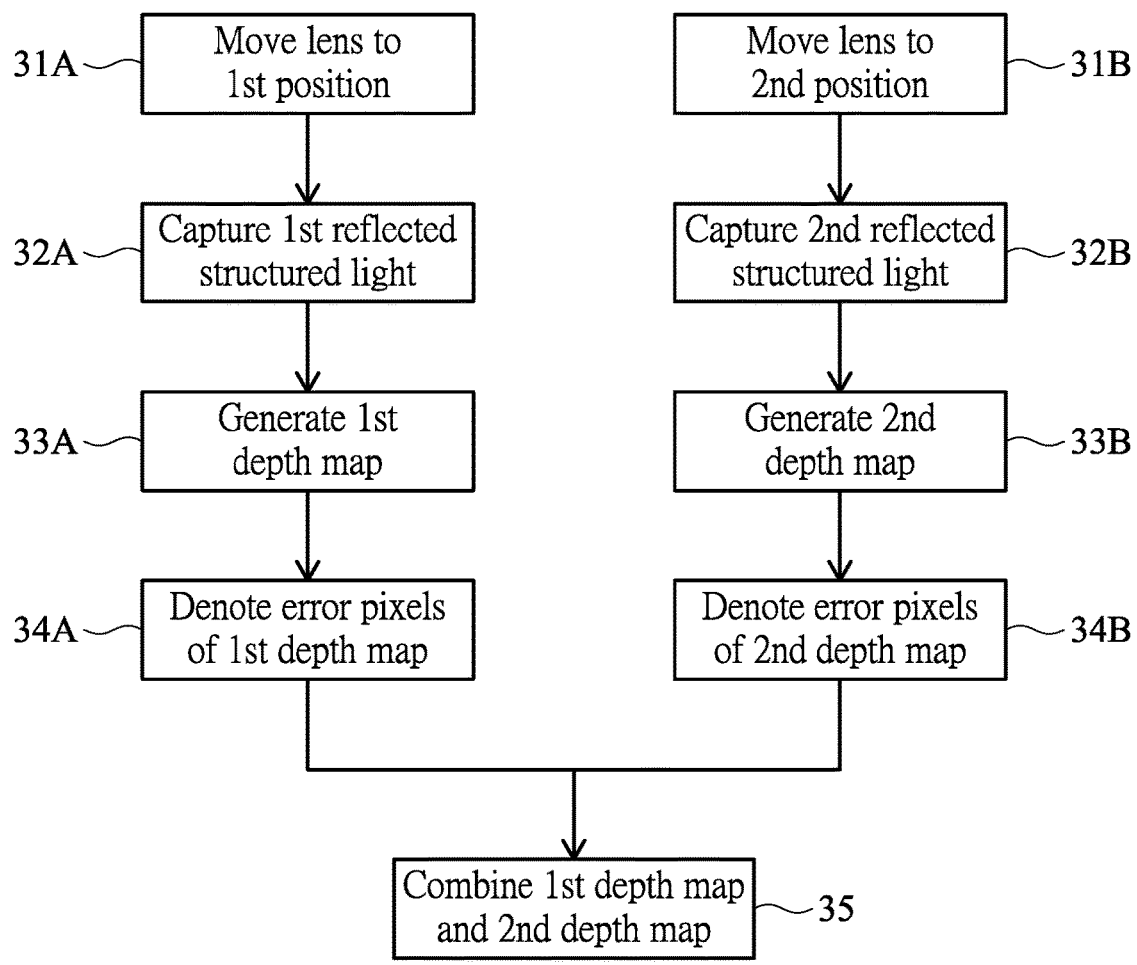
FIG. 3 shows a flow diagram illustrating a structured-light (SL) method of dynamically generating a depth map according to another embodiment of the present invention.

FIG. 3 shows a flow diagram illustrating a structured-light (SL) method 300 of dynamically generating a depth map according to another embodiment of the present invention. Specifically, in step 31A, the processor 14 controls the actuator 133 to move the lens 131 to a first position (or near position) with associated first depth of field (DOF) that substantially covers a range near the image capture device 13. Next, in step 32A, the image sensor 132 of the image capture device 13 captures first reflected structured light, thus resulting in a first image containing the first reflected structured light. The captured image is then processed by the processor 14 to generate a first depth map associated with the first DOF (step 33A). In step 34A, error (or blur) pixels of the first depth map may optionally be denoted (or marked) for later use.

Figure 4A:
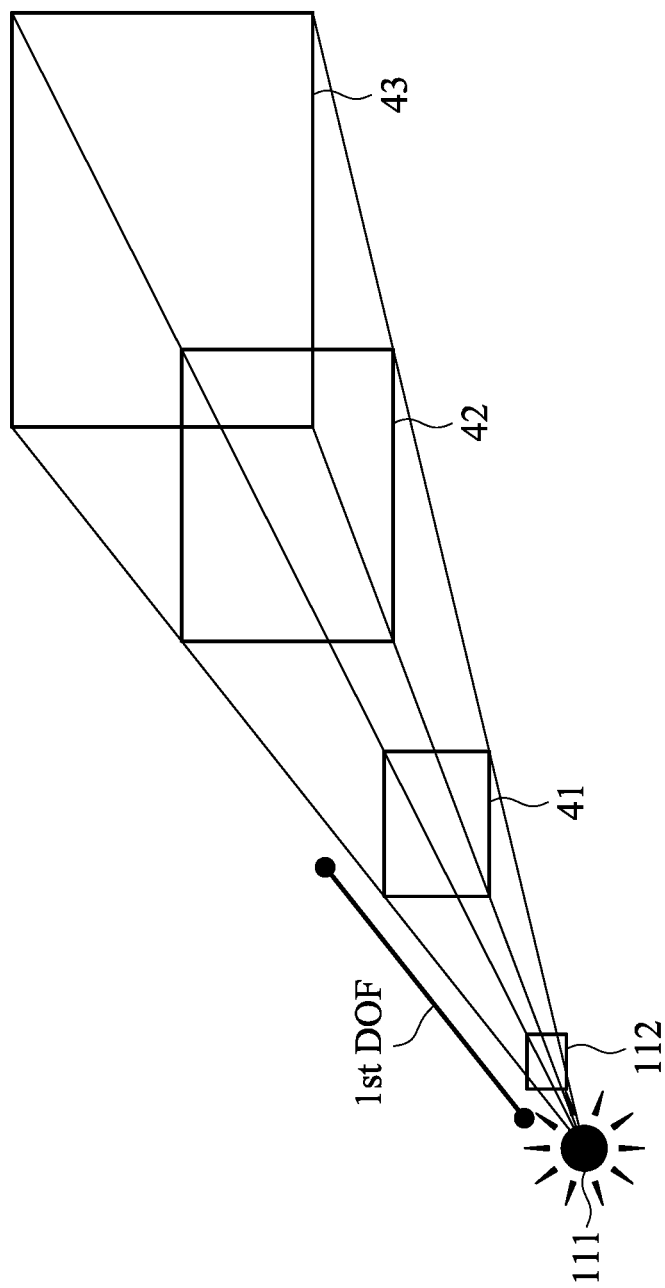
FIG. 4A schematically shows capturing an image containing first reflected structured light with first DOF.

FIG. 4A schematically shows capturing an image containing first reflected structured light (emitted from the DOE 112 lighted by the light source 111) with first DOF. In this case, a first captured image 41 is acceptably sharp because corresponding scene is in the first DOF, but a second captured image 42 and a third captured image 43 farther than the first captured image 41 are probably foggy or blur because corresponding scene is out of the first DOF.

Referring back to FIG. 3, in step 31B, the processor 14 controls the actuator 133 to move the lens 131 to a second position (or far position) with associated second depth of field (DOF) that substantially covers a range far from the image capture device 13. It is noted that the first DOF (in step 31A) is located nearer the image sensor 132 than the second DOF (in step 31B). In the embodiment, there is preferably overlap between the first DOF and the second DOF. For example, the first DOF ranges between 25 cm and 3 m, and the second DOF ranges between 2.5 m and 10 m. Next, in step 32B, the image sensor 132 of the image capture device 13 captures second reflected structured light, thus resulting in a second image containing the second reflected structured light. The captured image is then processed by the processor 14 to generate a second depth map associated with the second DOF (step 33B). In step 34B, error (or blur) pixels of the second depth map may optionally be denoted (or marked) for later use.

Figure 4B:
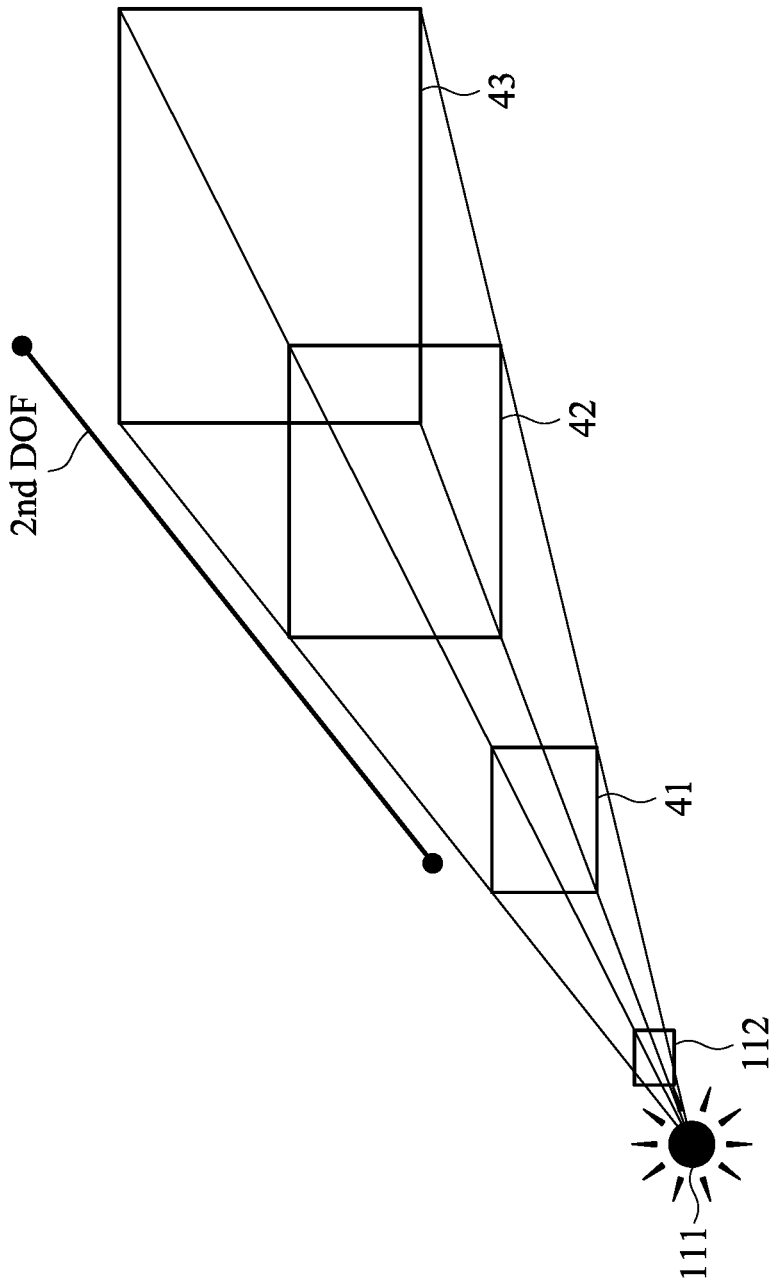
FIG. 4B schematically shows capturing an image containing second reflected structured light with second DOF.

FIG. 4B schematically shows capturing an image containing second reflected structured light (emitted from the DOE 112 lighted by the light source 111) with second DOF. In this case, a first captured image 41 is probably foggy or blur because corresponding scene is out of the second DOF, but a second captured image 42 and the third captured image 43 are acceptably sharp because corresponding scene is in the second DOF.

In step 35, the processor 14 combines the first depth map (from step 33A) and the second depth map (from step 33B) to result in a combined depth map. The combing of the first depth map and the second depth map may be executed, for example, by using image compositing technique. In one exemplary embodiment, Alpha blending technique may be adopted to generate the combined (or composite) depth map. Specifically, a translucent first depth map and a translucent second depth map are combined (or blended) to generate a blended depth map. The translucency of the first depth map and the second depth map may range between completely transparent and completely opaque. The blended depth map is computed as a weighted average of the first depth map and the second depth map. In one embodiment, the error pixels of the first depth map and the second depth map are assigned lower weightings than normal (or clear) pixels of the first depth map and the second depth map when combining the first depth map and the second depth map.

Although specific embodiments have been illustrated and described, it will be appreciated by those skilled in the art that various modifications may be made without departing from the scope of the present invention, which is intended to be limited solely by the appended claims.

What is claimed is:

1. A structured-light (SL) method of dynamically generating a depth map, comprising:
    moving a lens of an image capture device to a first position associated with first depth of field (DOF);
    capturing first reflected structured light with the first DOF, thereby resulting in a first image;
    processing the first image to generate a first depth map;
    moving the lens to a second position associated with second DOF, the second DOF being nearer the image capture device than the first DOF;
    capturing second reflected structured light with the second DOF, thereby resulting in a second image;
    processing the second image to generate a second depth map;
    denoting error pixels of the first depth map;
    denoting error pixels of the second depth map; and
    combining the first depth map and the second depth map to result in a combined depth map;
    wherein combined depth map is computed as a weighted average of the first depth map and the second depth map; and
    the denoted error pixels of the first depth map and the second depth map are assigned lower weightings than other pixels of the first depth map and the second depth map when performing weighted average.

2. The method of claim 1, wherein the first DOF and the second DOF overlap.

3. The method of claim 1, wherein the first depth map and the second depth map are combined by using blending technique.

4. The method of claim 1, wherein the first image and the second image are invisible images.

* * * * *